United States Patent [19]

Montgomery, Jr. et al.

[11] 4,341,492

[45] Jul. 27, 1982

[54] METHOD FOR PNEUMATICALLY HANDLING AGGLOMERATIVE MATERIALS

[75] Inventors: William G. Montgomery, Jr., North Wales; T. Eric Pynor, King of Prussia, both of Pa.

[73] Assignee: R & M Associates, Inc., Valley Forge, Pa.

[21] Appl. No.: 122,624

[22] Filed: Feb. 19, 1980

[51] Int. Cl.³ .............................................. B65G 53/40
[52] U.S. Cl. ...................................... 406/130; 119/37; 222/195; 366/101; 366/139; 366/163; 406/168
[58] Field of Search .................. 406/28, 130, 168–173; 119/37, 38, 43; 366/101, 139, 163; 222/146 H, 195

[56] References Cited

U.S. PATENT DOCUMENTS 4,095,776 6/1978 Baumann et al. ............... 406/168 X
4,140,443 2/1979 Olson ........................... 222/146 HE

FOREIGN PATENT DOCUMENTS 1434835 2/1969 Fed. Rep. of Germany ... 222/146 H

OTHER PUBLICATIONS

"A Vacuum System for Handling Chicken Hatchery Waste" Oct. 1976, by Dickens et al., USDA AR-S-S-152.

Primary Examiner—Jeffrey V. Nase
Attorney, Agent, or Firm—Benasutti Associates, Ltd.

[57] ABSTRACT

A method for pneumatically handling material having a slurry-like consistency such as chicken hatchery waste material includes a hopper for accepting the waste material, a receiver for accumulating the waste material and duct work which is connected between the hopper and the receiver. The system also includes a blower for creating reduced pressure in the receiver with respect to the hopper whereby the waste material is drawn from the hopper to the receiver. The system also includes a valving arrangement whereby a volumn of reduced pressure is maintained within the receiver above the accumulated waste material, the pressure being reduced with respect to the outside ambient, thereby causing air from the outside ambient to enter into a discharge aperture in the bottom of the receiver, through the accumulated waste material to the volumn of reduced pressure, thereby agitating, loosening and effecting the rapid discharge of the accumulated waste material through the discharge aperture.

9 Claims, 3 Drawing Figures

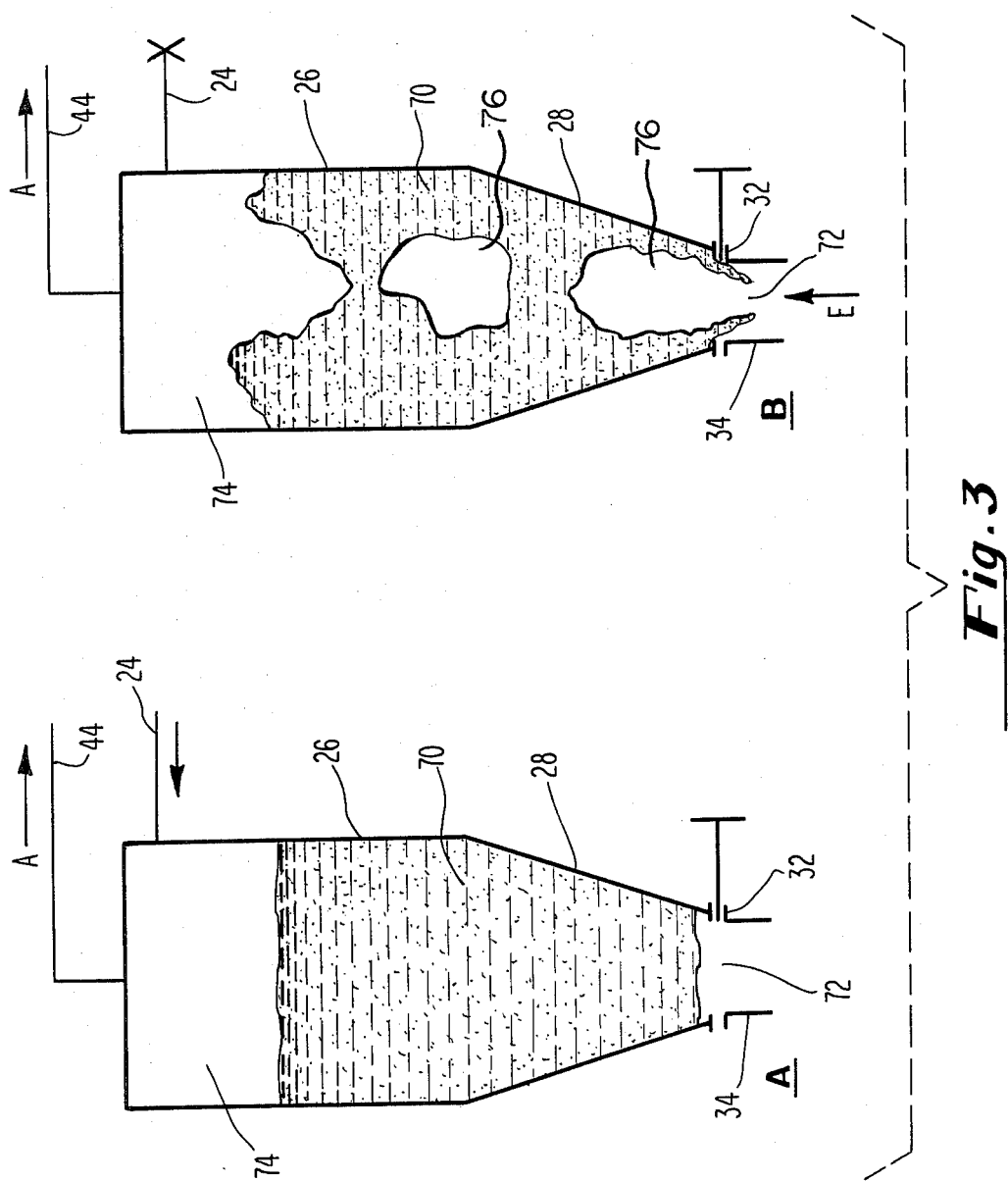

METHOD FOR PNEUMATICALLY HANDLING AGGLOMERATIVE MATERIALS

BACKGROUND OF THE INVENTION

This invention relates to methods for pneumatically conveying slurry-like materials and more particularly to a method for conveying chicken hatchery waste products.

In a typical chicken hatchery operation, fertilized eggs are placed in hatchery trays which are then placed in an incubator for a predetermined amount of time until the eggs hatch. The newly hatched chicks are then removed from the tray for debeaking and innoculation prior to being sent to another location where they are fed and raised for subsequent sale to the consuming public.

After the newly hatched chicks had been removed from the trays, the trays contain a considerable amount of waste including egg shells, unhatched eggs as well as a few chicks which have been culled as being unsuitable for feeding and raising. Initially, the waste was manually dumped from trays into a dump truck, where it was exposed to the weather elements for as long as an entire six hour shift before being covered and transported to a land fill or other disposal area.

An improved system for disposing of hatchery waste was developed by Dickens, et al. (see U.S. Department of Agriculture, Agricultural Research Service Report entitled "A Vacuum System for Handling Chicken Hatchery Waste", October 1976, Paper No. ARS-S-152). The Dickens et al. system included a hopper into which the hatchery waste was dumped from the trays; a pump, or blower, to provide the force to transport the waste; and a receiver, to separate waste material from air and store the waste material until it was dumped into a transporting vehicle. The system also included duct work to connect the hopper, blower and receiver.

Hatchery waste material was a variable consistency which depends upon the percentage hatch, the number of culled chicks, as well as incidental quantities of floor waste, wash water and disinfectants which may find their way into the waste system. For example, if the hatch rate was 100% and there were no culled chicks and the incidental waste materials were prevented from entering the waste system, the hatchery waste composition would substantially comprise dry particulate matter composed of crushed egg shells. However, since these ideal conditions never exist, the waste usually has a slurry-like consistency which tended to cause problems in prior art waste handling systems like those disclosed in the Dickens et al. report. The more liquid the consistency, the more clogging problems one might encounter.

These clogging problems were recognized and partially solved (see, for example, the Dickens et al. report on page 6 where clogging in the duct work system was eliminated by reducing the angle of lift provided by the ducts from 90° to 45°). Another part of the system, in which clogging has been a major problem, is in the receiver in which the solid matter is separated and stored. Prior art waste handling systems incorporated several types of receivers, most of which were characterized by the fact that their waste material storage handling capability was limited. This limited storage handling capability was primarily due to the fact that the stored material had a tendency to bridge across the discharge aperture located at the bottom of the receiver and was thereby prevented from flowing out of the receiver into the transporting vehicle under the influence of gravity.

In large capacity receivers, a preferred configuration entails the use of a tapered portion at the bottom of the receiver which culminates in a reduced area discharge aperture. Having a reduced area discharge aperture is desirable since it is easier to provide an effective vacuum closure on a smaller aperture. An effective vacuum closure is necessary for the efficient operation of such a pneumatic conveying system, since leaks in the system would tend to reduce the conveying force provided by pressure differentials within the system. In addition, a smaller discharge aperture is desirable for mating with covered transporting vehicles. The tapered portion in large receivers aggravates the aforementioned bridging and concomitant clogging.

The use of a small receiver could also contribute to system clogging. In a typical pneumatic waste handling system, whenever it is desired to unload the receiver, the vacuum in the system is broken, the discharge aperture open and the waste material then disgorged from the receiver into a transporting vehicle under the influence of gravity. At those times when the vacuum is broken, any waste material that was in the process of being conveyed from the hopper to the receiver along any upwardly inclined conveying duct work, would then tend to flow backwards causing system clogging problems.

As can be determined from the previous discussion, the use of a small receiver in a pneumatic waste handling system is undesirable not only from the standpoint that the receiver would have to be unloaded relatively frequently during the course of the hatchery workers shift, but that system clogging could also be fostered by the frequent unloading operation. It is therefore desirable to use a large receiver if possible, preferably one which would store all wastes accumulated during the course of an entire shift.

As previously stated, in prior art systems the use of large receivers tends to create clogging problems in the receiver itself. One prior art solution to receiver clogging was to install water jets at the top of the receiver, which jets would spray water down on top of the stored material theoretically causing it to float down and out of the discharge aperture on the bottom of the receiver. Because of the material bridging effect, the water tended to remain on top of the clogged waste material.

Another solution to waste material clogging in the receiver was to use a large, straight walled receiver in which bridging would be minimized. A receiver having this configuration would necessitate the use of a large, difficult to seal, openable discharge aperture cover. The solution to the problem of an inefficient seal on the bottom of such a receiver was to use a knife gate valve in substantially the center of such a receiver. This knife gate valve divides the receiver into a top chamber and a bottom chamber, the bottom chamber terminating in a closure over the discharge aperture. This solution purported to enable the collection of waste materials in the top chamber during operation of the system, opening the knife gate valve and allowing the materials to fall into the bottom of the chamber without stopping the system, closing the knife gate valve in order to accumulate additional waste material in the top chamber, while being able to open the closure over the discharge aperture and allowing the materials to drop straight out of the bottom chamber. This solution required not only the use of an additional closure valve, the discharge aperture seal was still a problem while the knife gate valve was in the open position.

SUMMARY OF THE INVENTION

A method and apparatus is disclosed for accepting and conveying chicken hatchery waste products to a receiver for temporary storage prior to being unloaded into a transporting vehicle. This is accomplished by numerous features incorporated in applicants' invention.

One such feature is waste hopper means for receiving hatchery waste material. The waste hopper means are preferably located in the area of the chicken hatchery where the newly hatched chicks are removed from the shells.

Another feature is receiver means for temporarily storing the accumulated hatchery waste material. The receiver means is preferably large enough to accumulate all the hatchery waste materials generated throughout an entire shift, which is approximately equal to six hours. The receiver means is preferably located outside of the hatchery building and is preferably elevated such that a transporting vehicle can be driven under the receiving means whereby the accumulated waste material can then be dumped into the transporting vehicle.

Yet another feature is blower means for conveying the waste material through duct work from the hopper means to the receiver means.

Yet another feature is novel means for eliminating clogging of waste material within the receiver means comprising a novel valving arrangement whereby the vacuum which is generated primarily to convey the waste materials from the hopper means to the receiver means, is used to cause an unheaval in the waste material stored in the receiver means to eliminate bridging and the concomitant clogging produced thereby.

Accordingly, one object of the present invention is the provision of a novel system for handling hatchery waste in which clogging is minimized.

Another object of the present invention is the provision of a novel system for rapidly unloading accumulated hatchery waste material from a waste material receiver.

A further object of the present invention is the provision of a waste handling system utilizing vacuum generation means for conveying waste material from a hopper to a receiver, whereby the vacuum generated is used in a novel fashion to break up any bridging of material within the receiver thereby preventing clogging thereof.

A still further object of the present invention is the provision of a novel method of rapidly unloading accumulated hatchery waste material from a waste material receiver.

Yet another object of the present invention is the provision of a method of utilizing the vacuum generated in a pneumatic waste material conveying system to break up any bridging of material accumulated in a receiver thereby preventing clogging thereof.

These and other objects of the present invention will become apparent from the following more detailed description.

BRIEF DESCRIPTIONS OF THE DRAWINGS

FIG. 3 is a schematic representation of a receiver having stored waste materials therein, showing how the novel unclogging feature of the present invention dislodges material bridging to effect rapid discharge of the waste material from the receiver.

DETAILED DESCRIPTION OF THE DRAWINGS

Figure 1:
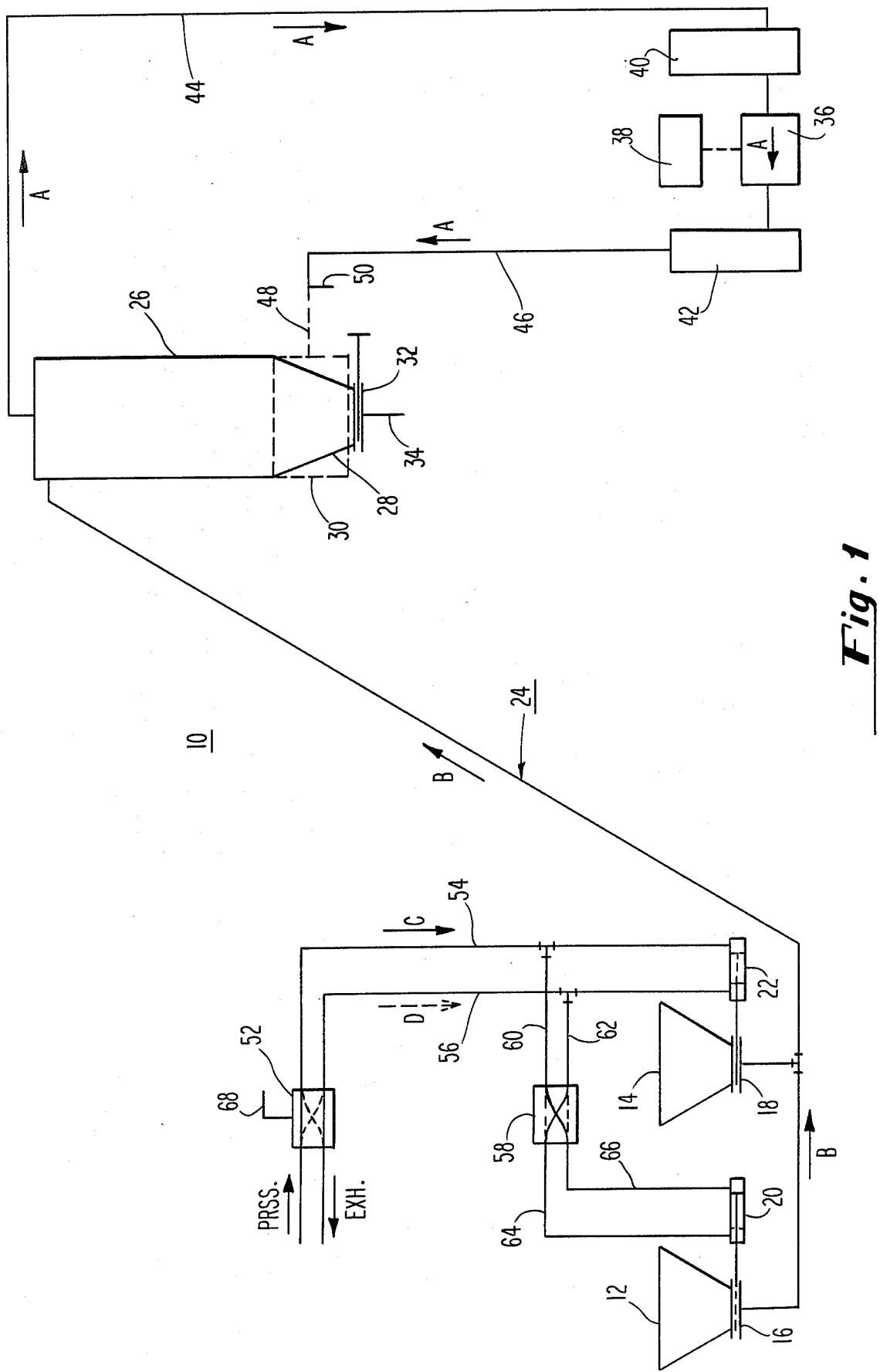
FIG. 1 is a schematic diagram of the preferred embodiment of the hatchery waste handling system of the present invention.

Although specific terms of the invention have been selected for illustration in the drawings, and the following description is drawn in specific terms for the purpose of describing these forms of the invention, this description is not intended to limit the scope of the invention which is defined in the appended claims.

Referring to FIG. 1, there is shown the preferred embodiment of the waste handling system of the present invention, generally designated 10. The system 10, comprises a first dump hopper 12 and a second dump hopper 14. Each dump hopper preferably has an inverted pyramidal shape with a rectangular top opening which tapers down to an aperture at the bottom. The rectangular top opening preferably has dimensions of 16½"×48½", which opening is larger then the standard hatchery trays from which the waste is dumped. To prevent the tray from falling into the dump hopper, a pair of bars are welded across the width of the opening at suitable locations, for example 11½" in from each end of the opening in the preferred embodiment. The discharge aperture of the bottom of the hopper is preferably circular having a 4" inner diameter.

A pneumatically operated knife gate valve, covers the discharge aperture at the bottom of each dump hopper. A first knife gate valve 16 covers the discharge aperture of the first dump hopper 12 and a second knife gate valve 18 covers the discharge aperture of the second dump hopper 14. Each knife gate valve is preferably a Dezurik, Model No. 824-W-B-LKCGC4, air cylinder operated 4" knife gate. The air cylinder operating the first knife gate valve 16, is schematically shown and designated 20 on FIG. 1. The air cylinder which operates the second knife gate valve, is also schematically shown in FIG. 1 and is designated 22. Each knife gate valve is connected to a first set of duct work generally designated 24. In the preferred embodiment, the duct work 24 comprises 4" schedule 10 aluminum pipe having stainless steel fittings at potential wear points. For example, the system preferably has stainless steel T's, bends and elbows in order to increase resistance to wear caused by abrasive waste material travelling through the duct work 24.

The duct work 24 provides fluid communication between the dump hoppers 12 and 14 and a receiver 26. The receiver 26 is a substantially cylindrical container which, in the preferred embodiment, is 12 ft., 3¼" in height, and having an inner diameter of 3 ft., 6". The bottom portion of the receiver 26 is tapered inward down to a circular discharge aperture having, in the preferred embodiment, a 12" inner diameter. This tapered portion forms a funnel for discharging waste material through the discharge aperture into a transporting vehicle which is positioned under the discharge aperture. Consequently, it is preferable that either the receiver 26 be elevated above the existing vehicle access roadway or the roadway be excavated such that the transporting vehicle can be driven underneath the discharge aperture of the receiver 26.

The funnel portion 28 of the receiver 26 is preferably surrounded by a heat skirt 30, which is shown by a dotted line in FIG. 1. The heat skirt 30 is preferably a cylinder which attaches to the funnel portion 28 of the receiver 26 toward the top of the funnel portion 28 for providing an enclosure for receiving heated air as will be subsequently described.

Attached to the discharge aperture of the receiver 26 is a knife gate valve 32 which, as indicated in FIG. 1, is hand operated. It should be noted that although the knife gate valve 32 is indicated as being of the hand operated variety, remotely operated knife gate valves, for example those which are peumatically or electrically driven, could be used and indeed may be preferred in more sophisticated, expensive systems which could incorporate valve logic and interlock systems as will be subsequently described. A flexible boot, schematically shown and designated 34 in FIG. 1, is preferably attached to the knife gate valve 32 for mating with a receiving aperture in a waste materials transport vehicle.

A blower 36 is used in the preferred embodiment of the waste handling system to generate the vacuum required to convey the waste materials from the dump hoppers to the receiver. The blower 36 is preferably a Roots model 412RCS-J which, in the preferred embodiment, is driven by a 25 horsepower 3600 rpm 208 volt, 3 phase, 60 cycle TEFC electric motor, 38. An in-line air filter 40, for example a Young type IF-G5-2, is connected to the blower 36 on the inlet side. A silencer 42, for example a Universal type RDY-5, is connected to the blower 36 on the outlet side. The system 10 includes a second set of duct work 44 for providing pneumatic communication between the receiver 26 and the in-line air filter 40. In the preferred embodiment, the second set of duct work comprises 6" schedule 80 pvc piping. A third set of duct work 46 is connected to the outlet of the silencer 42. The third set of duct work 46 comprises, in the preferred embodiment, 6" schedule 10 aluminum pipe which is connected, in the winter time, to an inlet aperture on the heat skirt 30, which connection is designated by the dotted line 48 in FIG. 1. In the summer, it is preferred that the third set of duct work 46 terminates in an elbow 50 for venting directly to the atmosphere as will be subsequently described.

The first and second air cylinders, 20 and 22, which operate the first and second knife gate valves 16 and 18 respectively, are connected to a supply of pressurized air as follows. Referring to FIG. 1, the pressurized air inlet of a four way valve 52, preferably a Barksdale manually operated four way valve, is connected to the supply of pressurized air designated "Press." in FIG. 1. Although the four way valve 52 shown in FIG. 1 is a manually operated valve, a remotely actuated valve, for example of the pneumatic or solenoid type, may also be used and should be considered to be within the scope and contemplation of the present invention. The exhaust air outlet of the valve 52 may be vented directly to the surrounding atmosphere. The exhaust air is indicated by "Exh." in FIG. 1.

A first controlled outlet from the valve 52 is connected to one side of the second air cylinder 22 by a first air line 54. The other side of the second air cylinder 22 is connected to the second controlled outlet of the valve 52 by means of a second air line 56. A first inlet of a second valve 58 is connected to the first air line 54 by means of a third air line 60. The second valve 58 is preferably a single solenoid operated four way valve, for example an Automatic Switch Company valve, Catalog No. 8342B2. The second inlet of the second four way valve 58 is connected to the second air line 56 by means of a fourth air line 62. The first outlet of the second four way valve 58 is connected to one side of the first air cylinder 20 by means of a fifth air line 64. The second outlet of the second four way valve 58 is connected to the other side of the first air cylinder 20 by means of a sixth air line 66. In the preferred embodiment, all air lines are ¼" copper tubing connected by suitable couplings.

The operation of the system 10 of the present invention is described in conjunction with FIG. 1 as follows. The electric motor 38 drives the blower 36 which causes air to flow in the second and third sets of duct work 44 and 46 in the direction indicated by the arrows labeled "A". As a result, the blower draws air from within the receiver 26 creating reduced pressure therein. Under normal operation of the system, this reduced pressure is on the order of 4" of mercury. This reduced pressure creates a pressure diferential between the dump hoppers 12 and 14, the openings of which are substantially at atmospheric pressure, and the receiver 26. This pressure differential causes the waste material to flow in the direction indicated by the arrows "B" in FIG. 1.

In order to assure the efficient movement of waste material, the system of the present invention incorporates a novel valving arrangement whereby only one dump hopper knife gate valve can be opened at any one time. For example, as shown in FIG. 1, the pressurized air entering the first four way valve 52 is directed, as indicated by arrow "C", to the closing side of the second air cylinder 22 by the first air line 54 and the opening side of the first air cylinder 20 by the third and fifth air lines, 60 and 64, through the second four way valve 58. As schematically represented in FIG. 1, the unenergized position of the second four way valve is shown by the dotted lines while the solid lines indicate the state of the second four way valve 58 when it is energized. Likewise, the state of the first four way valve 52 is indicated by solid lines when the operating handle 68 is in one position, the dotted lines indicating the state of the first valve 52 when the operating handle 68 is in the other position. Consequently, when the operating handle 68 of the first four way valve 52 is in the position schematically shown in FIG. 1, and the second four way valve 58 is unenergized, the first knife gate valve 16 of the first dump hopper 12 will be withdrawn to the open position by the first air cylinder 20 as schematically indicated by the solid lines in FIG. 1. Likewise, the second knife gate valve 18 of the second dump hopper 14 will be driven to the closed position by the second air cylinder 22 as schematically indicated by the solid lines in FIG. 1.

Turning the operating handle 68 to the second operating position, will cause the pressurized air to enter the other side of the second air cylinder 22 by means of the second air line 56, as indicated by dotted arrow "D", thereby causing the second air cylinder 22 to withdraw the second knife gate valve 18 from its closed position to an open position schematically represented by dotted lines in FIG. 1. At the same time, the pressurized air will enter the closing end of the first air cylinder 20 by means of the fourth and sixth air lines, 62 and 66 through the second four way valve 58, thereby causing the first knife gate valve 16 to be driven to the closed position as schematically indicated by the dotted lines in FIG. 1. Consequently, turning the operating handle 68 from the first position to the second position will cause the first knife gate valve 16 to close and the second knife gate valve 18 to open. It should be noted that in the preferred embodiment, the operating handle 68 of the first four way valve 52 is connected to a pair of pull handles, one handle being located in proximity to a respective dump hopper and connected to the operating handle 68 by means of cords and pulleys. In this way, the person removing the chicks and dumping the waste product into the dump hopper can simply pull his respective pull handle in order to operate the knife gate valve at his dump hopper.

During normal operation, the system 10 will cause all waste materials dumped in the first and second dump hoppers 12 and 14 to be conveyed and accumulated in the receiver 26 as previously described. As stated above, it is preferable that the receiver 26 be of such a size that it is able to accumulate all waste materials generated during an entire shift of hatchery operations. Consequently, at the conclusion of the shift, the waste material accumulated in the receiver 26 will be dumped into a transporting vehicle (not shown) for transporting to a desired remote location, for example a crop field since the hatchery waste material includes various crop nutrients which make it desirable as a fertilizer. In order to discharge the accumulated material into the transporting vehicle, the knife gate valve 32 covering the discharge aperture of the receiver 26 is opened. In the preferred embodiment, this is a hand operation, but as previously stated, it may be desirable to have this operation be performed remotely and/or automatically. One such desirable operation will be subsequently described.

FIG. 3A is a schematic representation of a receiver 26, having waste material 70 accumulated therein. Due to the variable consistency of the waste material 70 which, as previously stated, could range from powdered particulate matter to a heavy slurry-like consistency, the material has a tendency to bridge within the receiver 26, particularly in the funnel portion 28. This bridging tendency effectively forms a plug preventing the waste material 70 from flowing out of the discharge aperture 72 of the receiver 26 as shown in FIG. 3A. Under normal operation, with air and waste material being delivered to the receiver 26 by the duct work 24 in the direction indicated by the arrow B and with air being removed from the receiver 24 through the second set of duct work 44 in the direction indicated by the arrow A, the region designated 74 within the receiver 26 is a region of reduced pressure, on the order of 4" of mercury. As a result, when bridging occurs as shown in FIG. 3A, the waste material 70 remains within the receiver 26, having a region 74 above it of reduced pressure even though the valve 32 has been opened.

While the quiescent state depicted in FIG. 3A exists, the material will not flow out through the discharge aperture 72 into the transporting vehicle. Prior attempts to correct this quiescent condition included probing upward into the discharge aperture 72 using, for example a long stick or rod, or a relatively high pressure stream of water in order to disrupt the material bridges thereby permitting the material to be disgorged through the discharge aperture 72. Needless to say, having an operator stirring up the material through the discharge aperture 72 could be extremely hazardous since a sudden disgorgement of the waste material could inundate and possibly injure the operator.

The dislodgement of the material in this quiescent state has been solved by a unique feature of the present invention which operates as follows. Referring again to FIG. 1 as well as to FIG. 3, at that point in the operation of the system 10 when it is desired to unload the waste material from the receiver 26, the operating handle 68 of the first four way valve 52 is placed in the position shown in FIG. 1 thereby causing the first four way valve 52 to be placed in the state indicated by the solid lines of FIG. 1, thereby causing the first dump hopper knife gate valve 16 to be in the open position and the second dump hopper knife gate valve 18 to be in the closed position. The knife gate valve 32 is then opened as shown in FIG. 3A. After opening the knife gate valve 32, the operator engages the solenoid on the solenoid operated second four way valve 58 causing the valve 58 to assume the energized state as represented by the solid lines in FIG. 1. Consequently, the pressurized air is directed to the closing side of the first air cylinder 20 through the first air line 54, the third air line 60, the second four way valve 58 and the sixth air line 66. The pressurization of the first air cylinder 20 in this manner will cause the first knife gate valve 16 to be driven to the closed position.

This system configuration, having both first and second dump hopper knife gate valves closed, is schematically represented in FIG. 3B with respect to the receiver 26. As can be seen in FIG. 3B, the ingress of air and material through the duct work 24 has essentially been shut off due to the closure of both the first and second knife gate valves 16 and 18 in the first and second dump hoppers 12 and 14 respectively. This creates a momentary high vacuum (on the order of 10 to 12 in. of mercury in the preferred embodiment) in the reduced pressure region 74 above the waste material 70, since the blower 36 is still causing the evacuation of air from the receiver 26 through the second set of duct work 44. As the region 74 attains the momentary high vacuum condition, atmospheric pressure causes air to be forced in through the discharge aperture 72 in the direction indicated by arrow "E" in FIG. 3B. This influx of air tends to create large bubbles 76 which tend to lift and agitate the waste material thereby destroying the bridging effect, which in turn causes the loosening, releasing and disgorging of the waste material from the receiver 26 in a relatively short period of time.

Using this unique feature the present invention, the unloading operation has been reduced to a time span of less than a minute wherein the past, using the probing technique, the unloading operation could have taken 5 minutes or longer depending upon the consistency of the waste material stored in the receiver. In the preferred operation of the system, the operator energizes the solenoid operated second four way valve 58 for approximately 20 seconds before it is released. This 20 second operation is usually long enough to permit a sufficient influx of air to cause the loosening and disgorging of the stored waste material. After the approximate 20 second interval, the solenoid operated second four way valve 58 is deenergized, causing the first dump hopper knife gate valve 16 to re-open, and the knife gate valve 32 on the receiver 26 is closed. It may be desirable to operate the system for a brief period of time after the receiver 26 has been emptied in order to make sure the duct work 24 has been cleared of waste material. After this, the blower is shut down and the knife gate valve 32 reopened, if desired, to wash down the interior of the receiver 26.

As previously stated, the third set of duct work 46 can either be connected to the heat skirt 30 or can be terminated in the elbow 50. Since it is preferable that the receiver 26 be mounted outside of the hatchery building in order to efficiently expedite the unloading of the accumulated waste materials into a transporting vehicle, the receiver and the waste materials stored therein could possibly be exposed to relatively low temperatures in the winter time. In order to prevent the accumulated material from freezing, uses made of the heated air coming from the blower 36 through the silencer 32 to prevent the accumulated waste material from freezing. This is an energy efficient operation since the blower creates pressurized air having an elevated temperature at its outlet. This heated air is then directed to the heat skirt 30 by the third set of duct work 46 thereby creating a blanket of warm air around the funnel portion 28 of the receiver 26 within the heat skirt 30. This blanket of warm air will prevent the accumulated waste material from freezing and thereby preventing the discharge of the waste material to the transporting vehicle. In the summer, when the receiver 26 is exposed to higher ambient temperatures, the heat skirt temperature is not needed and it is preferable that the third set of duct work 46 be terminated in the elbow 50 to discharge the heated air directly into the ambient environment. It is preferred that the elbow 50 be oriented having its opening facing downward to prevent rain and foreign materials from falling into the third set of duct work 46.

Figure 2:
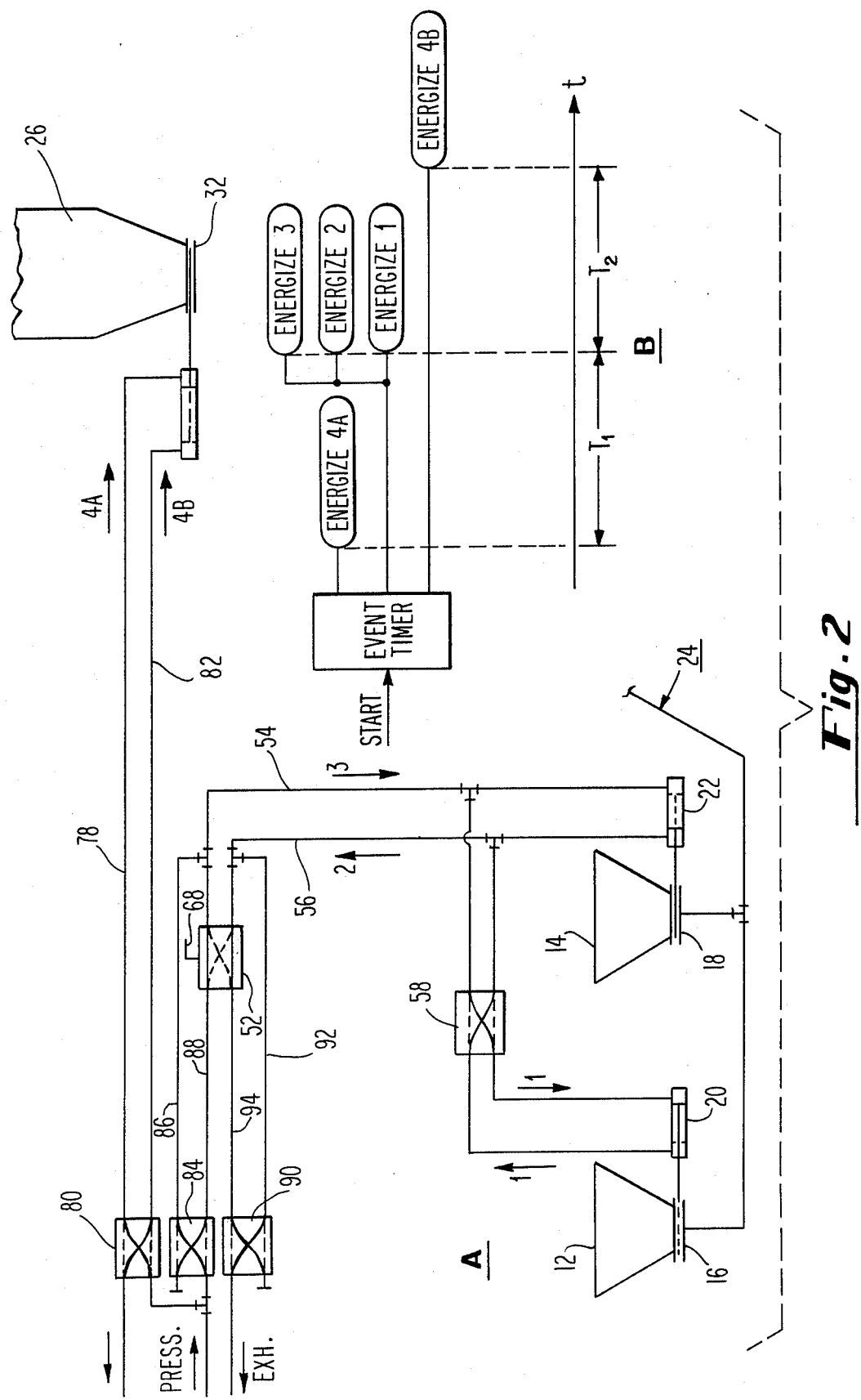
FIG. 2 is a schematic diagram of an alternate embodiment of a novel unclogging feature of the system of the present invention.

FIG. 2 depicts an alternate embodiment of that portion of the system 10 which enables the dislodging influx of air into the receiver 26 automatically upon initiation of a start command, in the form of a depressed push button for example. As shown in FIG. 2A, the hand operated knife gate valve 32 has been replaced by a knife gate valve which is operated by a third air cylinder 76. The closing side of the third air cylinder 76 is connected to a first controlled outlet of a fourth solenoid operated four way valve 80 by a seventh air line 78. The inlet of the fourth solenoid operated four way valve 80 is connected to the pressurized air supply. It is preferred that the fourth solenoid operated four way valve 80 be of a dual solenoid construction where the energizing of solenoid 4a would cause the valve to assume the state indicated by the solid lines in FIG. 2A and the energizing of the solenoid 4b would cause the valve to assume the state indicated by the dotted lines in FIG. 2A. The closing side of the third air cylinder 76 is connected to a second controlled outlet of the fourth solenoid operated four way valve 80 by means of an eighth air line 82. The exhaust outlet of the valve 80 may be vented directly to atmosphere.

The first air line 54 is connected to a first controlled outlet of a third solenoid operated four way valve 84 by means of a ninth air line 86. The third solenoid operated four way valve 84 is preferably a single solenoid valve wherein the energized state is depicted by the solid lines in FIG. 2A and the unenergized state is depicted by the dotted lines. The second controlled outlet of the third solenoid operated four way valve 84 is connected to a first inlet of the hand operated valve 52 by means of a tenth air line 88. A first inlet of the third solenoid operated four way valve 84 is capped while a second inlet is connected to the pressurized air supply which is indicated by the word "Press." in FIG. 2A. The second air line 56 is connected to a second controlled outlet of a second solenoid operated four way valve 90 by means of an eleventh air line 92. A second inlet of the hand operated four way valve 52 is connected to a first controlled outlet of the second solenoid four way valve 90 by means of a twelfth air line 94. The second solenoid operated four way valve 90 is preferably of a single solenoid construction having a state indicated by the solid lines in FIG. 2 when the solenoid is energized and a state indicated by the dotted lines in FIG. 2A when the solenoid is unenergized. A first inlet of the second solenoid operated four way valve 90 may be vented directly to the atmosphere and is indicated by the term "Exh." in FIG. 2A. The first inlet valve of the second solenoid operated four way valve 90 is capped.

As shown in FIG. 2B, upon receipt of a start command, the solenoids will be energized in a designated sequence by an event timer. The event timer may be a motor driven type, such as an Intermatic Timer which can be programmed to trip switches in a predetermined time sequence, or it can be a solid state event timer in which solid state switches are activated by an internal clock function generator. As shown in FIG. 2B, upon receipt of a start command, such as a push button switch depressed by an operator, the event timer will energize solenoid 4A causing pressurized air to be switched to the opening side of the third air cylinder 76, thereby withdrawing the knife gate valve 32 of the receiver 26 into the open position. After a preprogrammed delay $T_1$, to enable the knife gate valve 32 to be withdrawn to the open position, the solenoids operating the first, second and third solenoid operating four way valves 58, 90 and 84 respectively, are energized causing pressurized air to enter the closing side of the first air cylinder 20 and the second air cylinder 22 thereby placing the first and second knife gate valves, 16 and 18, respectively in the closed position. The event timer will keep the first, second and third solenoid valve energized for a predetermined time period $T_2$ (for example 20 seconds as previously stated), allowing the air to influx into the receiver 26 through its open discharge aperture 72 thereby effectuating the prompt disgorgement of the accumulated waste material as previously described. At the end of the second interval $T_2$ the first, second and third solenoid operated four way valves are deenergized causing the dump hopper knife gate valves to return to there normal state wherein only one is open. In addition, solenoid 4B is energized, causing the pressurized air to enter the closing side of the third air cylinder 76, causing the knife gate valve 32 to be driven to the closed position at which time the automatic unloading sequence is completed. It should be noted that the addition of the second and third solenoid operated four way valves, 90 and 84 respectively, ensures that the automatic sequence will be properly carried out no matter position the operating handle 68 of the hand operated four way valve 52 has been placed.

The system as described above, included two dump hoppers. It should be noted, depending on the user requirements, the system could incorporate one or more dump hoppers and need not be necessarily limited to two. The number of dump hoppers employed would be dictated by the number of waste handling stations the user desires. It should also be noted however, that it is preferable that only one dump hopper knife gate valve be opened at a time in order to insure the efficient operation of the pneumatic system. If more then one dump hopper gate valve is opened at a time, the pressure differentials created within the system tend to diminish thereby causing a reduction in the pneumatic conveying force.

It will be understood that various changes in the details, materials and arrangements of parts which have been herein described and illustrated in order to explain the nature of this invention may be made by those skilled in the art within the principal and scope of the invention as expressed in the following claims.

We claim:

1. A method for handling agglomerative material comprising the steps of:
   (a) providing hopper means for accepting said material;
   (b) providing receiver means for accumulating said material, said receiver means including a lower portion which tapers down to a discharge aperture in the bottom thereof;
   (c) providing fluid communication means between said hopper means and said receiver means;
   (d) pneumatically conveying said material from said hopper means to said receiver means through said fluid communication means;
   (e) expediting discharge of said accumulated material through said discharge aperture comprising the step of drawing air into said receiver means from the ambient atmosphere external to said receiver means through said discharge aperture for a predetermined period of time.

2. A method for handling hatchery waste material having a slurry-like consistency comprising the steps of:
   (a) providing hopper means for accepting said waste material;
   (b) providing receiver means for accumulating said waste material, said receiver means including a tapered lower portion having a discharge aperture in the bottom thereof;
   (c) providing fluid communication means between said hopper means and said receiver means;
   (d) pneumatically conveying said waste material from said hopper means to said receiver means through said fluid communication means; and
   (e) expediting discharge of said accumulated waste material through said discharge aperture comprising the step of drawing air into said receiver means from the ambient atmosphere external to said receiver means through said discharge aperture for a predetermined period of time.

3. The method in accordance with claim 2 wherein step (a) additionally comprises providing valve means for opening and closing an aperture in the bottom portion of said hopper means.

4. The method in accordance with claim 3 wherein step (b) additionally comprises providing valve means for opening and closing said discharge aperture.

5. The method in accordance with claim 4 wherein step (d) comprises providing a blower for pneumatically conveying said waste material from said hopper means to said receiver means through said fluid communication means.

6. The method in accordance with claim 5 wherein step (e) comprises at least partially evacuating said receiver through an aperture in an upper portion thereof.

7. The method in accordance with claim 6 wherein step (e) comprises closing said hopper aperture valve while said receiver discharge valve is open.

8. The method in accordance with claim 5 comprising the additional step of:
   (f) heating at least a portion of the tapered lower portion of said receiver means.

9. The method in accordance with claim 8 wherein step (f) comprises the steps of:
   (1) providing a heat skirt surrounding the tapered lower portion of said receiver means having an internal volume defined by the inner surface of said heat skirt and the outer surface of said tapered lower portion; and
   (2) directing a flow of air from an outlet of said blower into said internal volume.

* * * * *